United States Patent [19]

Genest et al.

[11] Patent Number: 4,558,175

[45] Date of Patent: Dec. 10, 1985

[54] SECURITY SYSTEM AND METHOD FOR SECURELY COMMUNICATING THEREIN

[75] Inventors: Leonard J. Genest, 1061 Tropic La., Santa Ana, Calif. 92705; J. Francis Calvagna, Anaheim, Calif.

[73] Assignee: Leonard J. Genest, Santa Ana, Calif.

[21] Appl. No.: 404,166

[22] Filed: Aug. 2, 1982

[51] Int. Cl.[4] .......................... H04L 9/00; H04Q 3/00

[52] U.S. Cl. .............................. 178/22.08; 340/825.34; 235/382; 235/382.5

[58] Field of Search ........................ 340/825.31, 825.34; 235/382, 382.5; 178/22.08

[56] References Cited

U.S. PATENT DOCUMENTS

| | | | |
|---|---|---|---|
| Re. 29,259 | 7/1977 | Sabsay | 235/382.5 |
| 3,622,991 | 11/1971 | Lehrer | 340/825.31 |
| 3,764,742 | 10/1973 | Abbott et al. | 178/22.08 |
| 3,821,704 | 6/1974 | Sabsay | 235/382.5 |
| 3,845,361 | 10/1974 | Watase et al. | 340/825.31 |
| 3,906,447 | 9/1975 | Grafton | 340/825.31 |
| 4,211,919 | 6/1980 | Ugon | 178/22.08 |
| 4,213,118 | 6/1980 | Genest et al. | 235/382.5 |
| 4,288,659 | 9/1981 | Atalla | 235/382 |
| 4,317,957 | 3/1982 | Sendrow | 235/382 |
| 4,453,074 | 6/1984 | Weinstein | 235/382 |

*Primary Examiner*—Salvatore Cangialosi

*Attorney, Agent, or Firm*—Nilsson, Robbins, Dalgarn, Berliner, Carson & Wurst

[57] ABSTRACT

A security system includes a central console, one or more locks, one or more console coded programmers to transport data in a secure manner between the central console and one or more of the locks and one or more enabling programmers to enable the lock to operate upon insertion of a special key into the lock. The central console encodes combination codes from its memory which correspond to combination codes stored in a memory level of one or more locks in the system. The encoding results in a first modifier code which is combined with other information to form a programmer data word. The central console processor next scrambles and transfers the resultant coded data word to a console coded programmer. The console coded programmer stores the coded data word in its memory until a communication link is established between a lock and the programmer. Thereafter, the console coded programmer first unscrambles the coded data word and then further encodes the first modifier code to obtain a second modifier code. The resultant modified data word is transferred to the lock which is programmed to first decode the second modifier code to obtain the first modifier code and then to decode the first modifier code to obtain the combination code to be used in the lock.

18 Claims, 10 Drawing Figures

| | CONSOLE PANEL ENTRY | | | | PROGRAMMER DATA WORD FORMAT | | | | | |
|---|---|---|---|---|---|---|---|---|---|---|
| | (1) LEFT DISPLAY READING (ID CODE LEVEL 3) | (2) RIGHT DISPLAY READING (ID CODES LEVELS 0,1 OR 2) | (3) SELECTOR SWITCH SETTING | (4) AUTHORIZATION LEVEL | (5) CRITERIA/ACTION CODE | (6) MODIFIER CODE | NOT USED | (7) SECONDARY ID | (8) INSTALLATION CODE | (9) ID |
| | | | | | 25 24 23 | 22 21 20 19 18 17 | 16 15 | 14 13 12 11 | 10 9 8 7 6 5 | 4 3 2 1 |
| EX1 | 0105 (R) | ------ | OPEN/LOCK | ANY | C83 | DON'T CARE | DON'T CARE | | 224876 (IC) | 0105 (R) |
| EX2 | ------ | ------ | OPEN/LOCK | MANAGER | 883 | " | " | | 224876 (IC) | DON'T CARE |
| EX3 | 0105 (R) | ------- | SYNCH | ANY | C2B | 457199 M1 | " | | 224876 (IC) | 0105 (R) |
| EX4 | 0105 (R) | 9000 (M) | SYNCH | ANY | D28 | 457199 M1 | DON'T CARE | 0105 (R) | 224876 (IC) | 9000 (M) |
| EX5 | ------- | 8000 (U) | SYNCH | MANAGER | C29 | 457199 M1 | " | DON'T CARE | 224876 (IC) | 8000 (U) |
| EX6 | 0105 (R) | 7000 (S) | SYNCH | ANY | D2B | 457199 M1 | " | 0105 (R) | 224876 (IC) | 7000 (S) |

FIG. 9A

| LOCK CRITERIA | | | | | LOCK ACTION | | |
|---|---|---|---|---|---|---|---|
| (10) LOCK R=LVL3 ID? | (11) LOCK M=LVL0 ID? | (12) LOCK U=LVL1 ID? | (13) LOCK S=LVL2 ID? | (14) IC=LOCK INSTALLATION CODE? | (15) UPDATE COMBINATION CODE IN | (16) OPEN | (17) REPEAT-ABLE |
| YES | — | — | — | YES | — | YES | NO |
| — | — | — | — | YES | — | YES | YES |
| YES | — | — | — | YES | LVL 3 | — | NO |
| YES | YES | — | — | YES | LVL 0 | — | NO |
| — | — | YES | — | YES | LVL 1 | — | YES |
| YES | — | — | YES | YES | LVL 2 | — | NO |

FIG. 9B

SECURITY SYSTEM AND METHOD FOR SECURELY COMMUNICATING THEREIN

BACKGROUND OF THE INVENTION

This invention relates to security systems and more particularly to apparatus and methods for communicating between individual components of the security system which are not otherwise linked.

Electronic security systems for controlling access to one or more secure areas are well known. Such security systems at first incorporated one or more electronic locks to secure a desired area and a magnetically, mechanically or electronically encoded key. In operation, if the code on the key matched the code stored in the lock, then the lock would open. However, the combination code of the lock in such systems was generally difficult to change and therefore provided little increase in security for hotels and the like where it was desired to change the combination code in the electronic lock each time the room was assigned to a new guest.

In order to solve this problem, various systems were devised which would enable the combination of the lock to be changed in response to the coding on a new key card. One such security system was disclosed in Sabsay, U.S. Pat. No. 3,821,704 issued June 28, 1974 and reissued as U.S. Pat. No. Re. 29,259 on June 7, 1977. In that patent, a central console is provided for encoding key cards with two data fields. Each lock is programmed to sense the data in the two fields on the card and to change the combination code in the lock if a particular matching sequence between the old combination code stored in the lock and the two fields of data stored on the key card is satisfied. Of course, all combination codes for all locks in the system also had to be stored in the memory of the central console to enable the key cards to be properly encoded.

While Sabsay provided a security system with practical application in facilities such as hotels, various disadvantages still existed. For example, Sabsay did not address the problem of how to synchronize each of the locks so that the combination code in each lock corresponded to the combination code for that lock stored in the central console.

In order to overcome this and other problems which hindered practical implementation of the Sabsay system, the security system of Genest et al. Pat. No. 4,283,710 was devised to include a permanent security override module and a temporary security override module which enabled the combination code for a particular lock to be loaded from the console into a memory in the module. The module could then be carried to and inserted in an out-of-sync lock with the data stored therein and transferred into and stored in the lock in place of the out-of-sync code combination. The Genest override modules additionally permitted various other functions to be performed to enable a practical implementation of a security system in a facility such as a hotel.

However, the Genest security system involved an inherent security weakness in that the communication link between the console and programmer and between the programmer and lock was not secure. This weakness resulted because the Genest security modules were simply conduits for the combination codes whereby a particular combination code was transferred from the console to the security module and thereafter transferred from the security module to the lock. Therefore, an unauthorized person could "read" the data in the security module memory and be able to determine what the combination code of a particular lock was.

In order to overcome this security weakness, the present invention provides a novel security system whereby the programmer device receives a coded data word from the console and then prior to transferring the coded data word to the lock, but only after the console coded programmer has been inserted into communication with the lock, decodes and in some instances further encodes the coded data word which is then transferred to the lock. The lock is then preprogrammed to reverse the encoding to obtain the desired combination code. Therefore, an unauthorized person "reading" the memory from the console coded programmer would be unable to derive the combination code without knowing first the encoding routine performed on the data word by the console prior to transferring the data word to the console coded programmer and second the decoding and in some instances further encoding operation performed by the programmer processor.

Therefore, the console coded programmer of the present invention, unlike the security module of Genest et al., is not merely a conduit but is an active processing device which manipulates the data words stored therein in one or more predefined ways prior to transferring the data word to the lock.

Further, in accordance with the invention, in the embodiment where the programmer further modifies the data word, the individual locks in the system are also programmed to decode the modified data word received from the console coded programmer by reversing both the encoding performed by the programmer and the encoding performed by the console. Hence, in that embodiment, an unauthorized person who is able to obtain a word from the programmer after the programmer had performed its encoding and decoding operations would still be unable to decipher the value of the combination code because that person could not derive the decoding routine programmed to be performed by the lock. Therefore, the present system provides significantly increased security in the data transmission link between the console, console coded programmer and individual locks.

SUMMARY OF THE INVENTION

A typical system in which the present apparatus and method in accordance with the invention may be utilized includes a central console having a memory for storing identification codes which identify one or more lock memories and combination codes for each memory of each lock, a front panel for inputting data and specifying the desired function to be performed by the system, and a processor which assimilates the information received from the console memory and from the front panel and generates data words for use by one or more of the locks.

The system may include keys which are encoded at the central console and which are given to guests, managers, maids or other persons authorized to enter a particular room or group of rooms. The keys are adapted to be inserted into a lock to open the lock or update the combination code of a specified lock memory and then open the lock in accordance with the method and system described in copending patent application Ser. No. 369,290 filed Apr. 16, 1982 which application is herein incorporated by reference.

The system also includes an active, data word modifying programmer which is selectively interconnected to receive coded data words from the central processor, is manually transported to one or more locks, and is inserted into those locks to transfer data words, altered by the programmer, to a lock to enable execution of one or more functions by the lock. The system further includes one or more electronic programmable locks, each of which has one or more memory levels in which both an identification code which identifies that particular memory and a combination code are stored. Each lock has a processor which receives the altered data words from the console coded programmer and makes various manipulations and comparison to determine the function to be performed by the lock and then to appropriately perform that function.

The present system may in addition include an emergency or enabling programmer which includes a connector for outputting data words to a lock, a memory for storing data words and a processor for manipulating the data words according to a preprogrammed system. In addition, the enabling programmer includes a function select switch which provides signals to the processor which in turn provides data words and command information to the lock. The data from the enabling programmer enables the reader on the lock to read coded data words from a key inserted into the lock's reader. The lock then uses the data from the key card to perform the function commanded by the enabling programmer. Therefore, the data word generated by the enabling programmer transferred to the lock will not contain combination codes but rather will contain only the installation code which is stored in the enabling programmer's memory. In the preferred embodiment, the installation code stored in the enabling programmer memory will be stored in scrambled form and the processor of the enabling programmer will be programmed according to a predefined unscrambling routine to output an unscrambled installation code only when the enabling programmer has been inserted into a lock and a communication link between the lock and the enabling programmer confirmed.

The enabling programmer is particularly useful in the event that the central console becomes inoperative. In such an event, the preprogrammed keys which are kept in a safe or other secure location are removed and used in conjunction with the enabling programmer, which does not need to be programmed by the central console, to access to one or more rooms in the hotel facility.

In one mode of operation using the console coded programmer, the programmer data word generated by the console is first scrambled to obtain a coded data word. The coded data word is transferred to the console coded programmer and the console coded programmer is physically taken to a particular lock. After verifying that a communication link between the console coded programmer and a lock is established, the console coded programmer proceeds to unscramble the coded data word and transfer the resultant altered data word to the lock where it is used.

In this embodiment of the invention, the decoding operations otherwise performed by the lock processor are not required since a combination code is not required by the lock to perform the commanded function.

In the mode where a combination code is to be transferred by the console coded programmer to a particular lock, the programmer data word generated by the console will include a combination code. However, prior to forming the programmer data word, the combination code to be included therein is modified according to a first modifying operation.

For example, the first modifying operation could simply be the addition of the combination code to an installation code which is a code common to all elements of the security system including each of the locks and the central console. The resultant number is a first modifier code which is used by the console to form a part of the programmer data word. The programmer data word is then scrambled according to a first preprogrammed operation as previously described with the resultant coded data word being transferred to the console coded programmer. The console coded programmer is physically removed from the console and is taken to a lock. Upon verifying that a communication link has been established, the console coded programmer first unscrambles the coded data word according to a second preprogrammed operation and then further modifies the first modifier code according to a second modifying operation. For example, the second modifying operation may be a further addition of the first modifier code and the installation code to obtain a second modifier code. The second modifier code is then inserted in place of the first modifier code to form the altered data word to be transferred to the lock from the console coded programmer.

The resultant altered data word is then transferred to the lock. The lock is preprogrammed to reverse not only the second modifying operation performed by the console coded programmer to obtain the second modifier code but is also programmed to reverse the first modifier operation used by the central console to obtain the first modifier code. By sequentially reversing these two modifying operations, the lock processor will be able to compute and obtain the proper combination code which then can be used in the manner indicated by the altered data word received by the lock.

BRIEF DESCRIPTION OF THE DRAWINGS

A complete understanding of the present invention and of the above advantages thereof may be gained from a consideration of the following description of the preferred embodiments taken in conjunction with the accompanying drawings in which:

FIGS. 9A and 9B show a chart illustrating several examples of the operation of the system and performance of the method in accordance with the invention.

DETAILED DESCRIPTION

Figure 1:
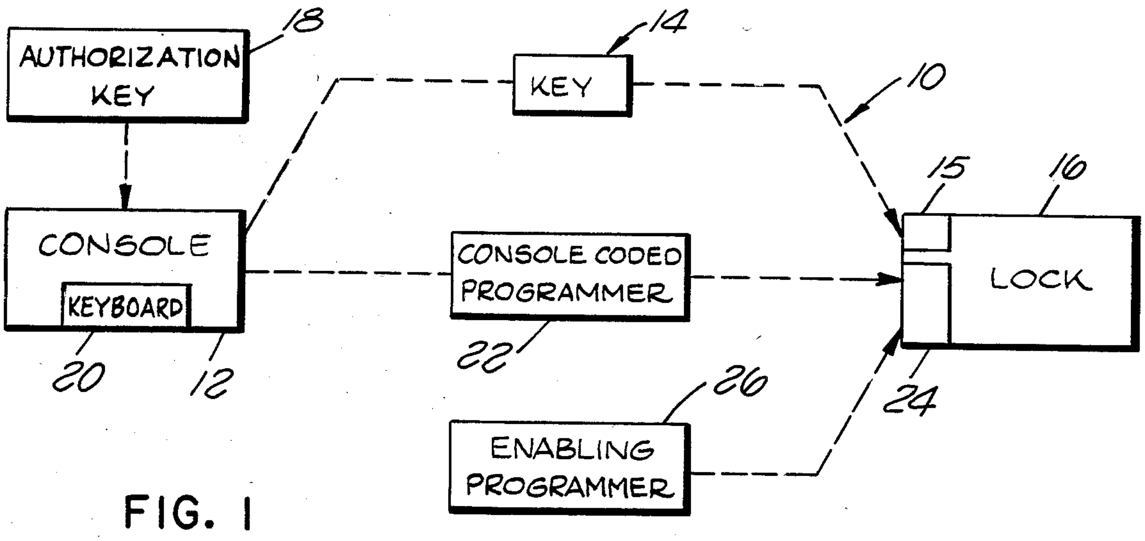
FIG. 1 is a simplified block diagram of a system which includes a console coded programmer and an enabling programmer used in providing a secure communication link to the lock.

Referring initially to FIG. 1, a system 10 which may be used in accordance with the present invention is illustrated as comprising a central console 12 and one or more keys 14 which are magnetically, mechanically, electrically or otherwise coded with a data word by the console 12 to serve as a communication link between the console 12 and one or more locks 16 in the system. Each lock 16 is provided with a key reader 15 into which one of the keys 14 is inserted. The key reader senses the electronically coded data on the key 14 and transfers that data into the lock 16 for processing to determine if the lock is to perform a predefined function such as opening a latch mechanism or updating a combination code.

The coding of data words onto the key 14 by the console 12 is controlled first by the insertion of an authorization key 18 into the console 12 by an operator. The console senses electronically stored data on the authorization key 18 and processes that data to determine not only whether the key 18 is valid but whether it is authorized to generate a card capable of initiating performance of the requested function. In addition to the authorization key 18, the console 12 also receives data from the operator through a keyboard 20. The instructions and data received through the keyboard 20 are used to define the contents of each data word authorized to be coded onto a key 14.

The security system 10 further includes an active console coded programmer 22 which like the key provides a communication link between the console 12 and one or more of the locks 16. Specifically, upon the insertion of a proper authorization key 18 into the console 12 and upon the introduction of appropriate data into the console through the keyboard 20, a programmer data word is generated by the console 12 and is then scrambled according to a predefined operation set to obtain a coded data word. The coded data word is then transferred to and stored in a memory in the console coded programmer 22.

The console coded programmer 22 may then be physically removed from the connector location in the console 12 and taken to a selected lock 16 where it is inserted into a programmer connector 24 in the lock 16. After the console coded programmer 22 has electronically verified that it is in communication with the lock 16 a processor in the console coded programmer 22 unscrambles the coded data word and transfers the resultant altered data word to the lock 16 which uses the altered data word to perform one or more functions coded into the programmer word by the console 12. It will be appreciated that in some embodiments of the invention, the altered data word may be the same as the programmer data word but in others the altered data word must be further modified by the lock according to preprogrammed operation set.

Finally, to enable the system to operate when there is a breakdown of the console, an enabling programmer 26 provides the prestored installation code as part of a data word sent to the lock via the program connector 24. After receiving the installation code and the command data from an enabling programmer 26, the lock 16 is enabled to read a special key 14 inserted in the key reader 15 of the lock. The coded data word which is prestored on the key 14 is then read by the key reader 15 and is thereafter used by the lock 16 to update the combination code of the lock or otherwise operate the lock in the desired manner.

Any suitable key 14, key reader 15 in the locks 16 and key encoder in the console may be utilized in accordance with the invention. For example, the type of key communication link disclosed in Grafton Pat. No. 3,906,447; Lehrer et al. Pat. No. 3,622,991; Aydin Pat. No. 4,177,657 or Enikeieff et al. Pat. No. 3,221,304 or any other suitable mechanical, magnetic, electronic, or any key communication apparatus may be used. In the embodiment disclosed hereafter, the key communication link is magnetic in nature operating according to the principals disclosed in Watase et al. Pat. No. 3,845,361.

Figure 2:
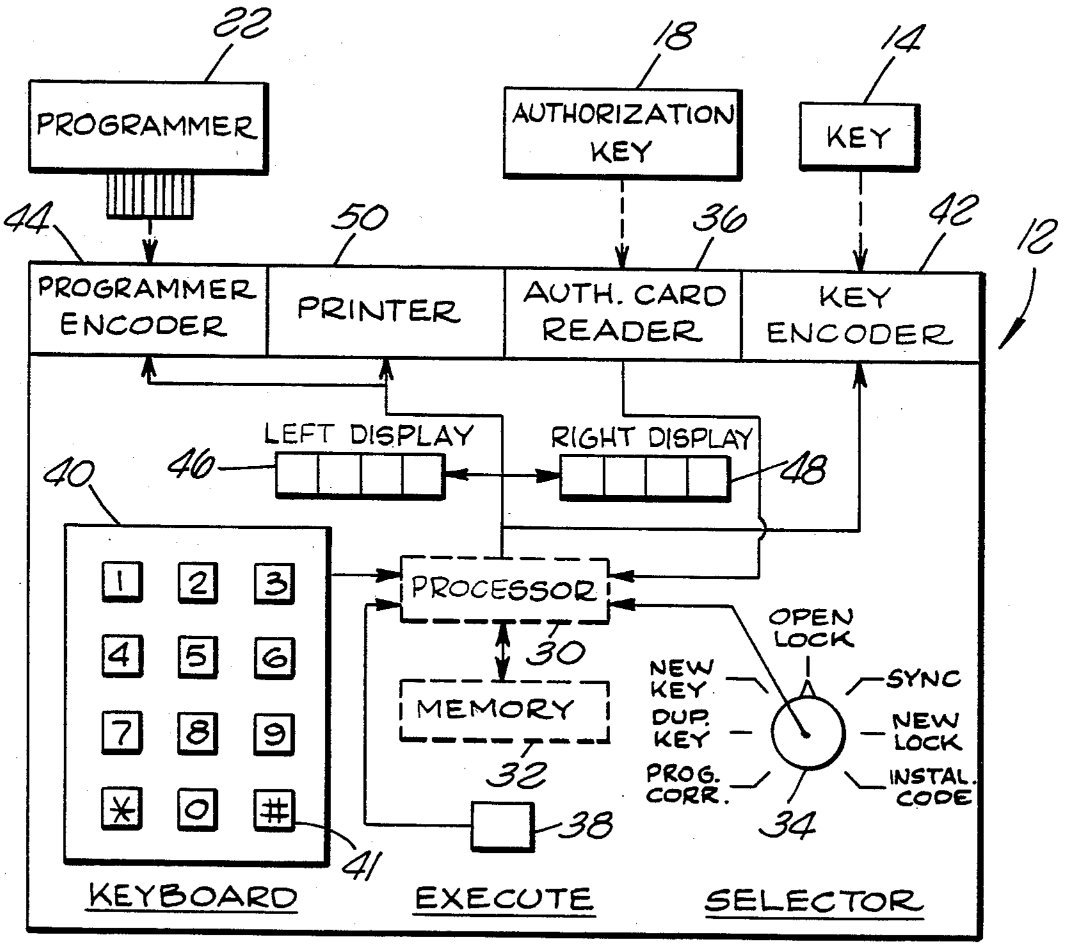
FIG. 2 is a simplified block diagram illustrating a central console in accordance with the invention.

Referring to FIG. 2, a console 12 in accordance with the invention essentially comprises a memory; a processor; various input and output devices by which data and commands are provided to the processor; and various output devices for outputting information from the console.

More specifically, a typical console 12 which may be used in accordance with the present invention comprises a processor 30 which is coupled in two-way communication with a memory 32. The processor may be any of a number of processors which are commercially available such as the Moster (TM) Z80 and which are programmable to process data in the manner to be described hereafter. Likewise, the memory 32 may be any of a number of commercially available memories such as the National Semiconductor NMC9716 electrically capable of storing an installation code common to all system locks and each combination code and identifications code stored in each lock as well as selected previously valid combination codes. The memory 32 may additionally be used to store any other pertinent data required by the processor.

The processor 30 receives operation commands from a rotary selector switch 34, an authorization card reader 36 adapted to read authorization keys 18, and an execute switch 38 which initiates performance of the function corresponding to the outputted commands. The processor 30 receives required data from the memory 32 and from a keyboard 40. When data is inputted via the keyboard 40, that data is displayed in either a left display 46 or a right display 48 at the option of the operator but according to the preprogrammed requirements of the processor 30. The display in which the inputted data appears may be changed by the operator by merely depressing the # key 41 on the keyboard 40. The display may be cleared by depressing the * key 43 on the keyboard 40.

After verifying that an authorization key 18 is proper, the console then obtains and operates on the data and the operation commands when the execute switch 38 is depressed. Data words for coding onto a key 14 via a key encoder 42 or data words for being transferred to a console coded programmer 22 via a programmer encoder 44 are then generated. The processor may also provide data to a suitable printer 50 which records all transactions performed by the central console 12. The interconnections between the various input and output devices and displays are well known and may be readily constructed by those skilled in the art.

Figure 3:
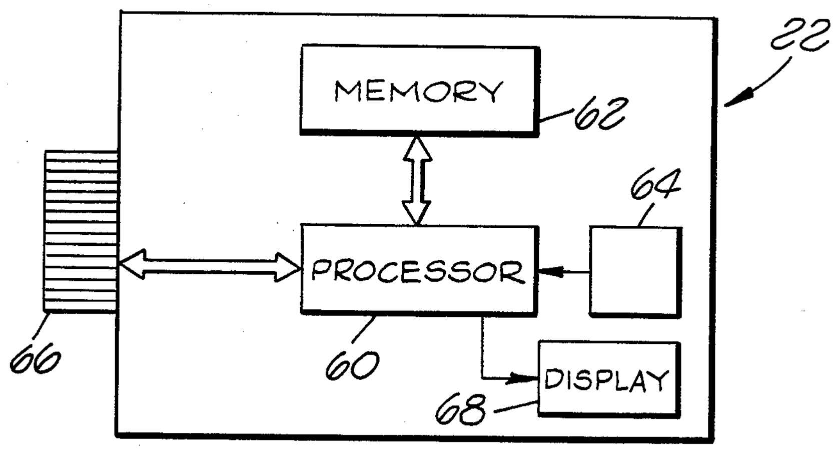
FIG. 3 is a simplified block diagram of a console coded programmer in accordance with the invention.

Referring next to FIG. 3, a simplified console coded programmer 22 in accordance with the invention includes a processor 60, a memory 62, an activate switch 64, a connector 66 and a display 68. The connector 66 is adapted to interface with a like connector in the programmer encoder 44 (FIG. 2) and a programmer connector 24 (FIG. 1) in a lock 16 whereby data can be transferred from the central console 12 to the console coded programmer 22 and thereafter transferred from the console coded programmer 22 to a lock 16.

In operation, when the connector 66 of the programmer 22 is inserted in the programmer encoder 44 and upon proper actuation of the central console 12, a data word from the console 12 is transferred through the connector 66 into the programmer 22 where it is stored in the memory 62. Subsequently, the console coded programmer 22 is carried to a lock 16 and is inserted in the programmer reader 24. The processor 60 initially verifies that an electronic communication link has been established between the programmer 22 and the lock 16. The display 68 indicates whether or not the electronic communication link has been established. Thereafter, upon depression of the activate switch 64, the coded data word in the memory 62 is transferred to the processor 60 where it is manipulated according to a preprogrammed operation set to be described hereafter. The altered data word is then transferred through the connector 66 into the lock 16 where it is used to command the processor in the lock 16 to perform any one or more of a number of preprogrammed functions.

Figure 4:
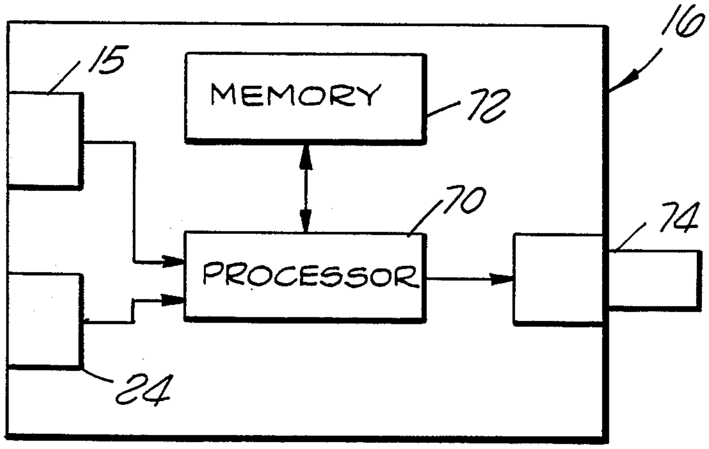
FIG. 4 is a simplified block diagram of a lock useful in accordance with the invention.

Referring to FIG. 4, a simplified lock 16 which may be utilized in a system operated in accordance with the present invention includes a processor 70 which may be any one of a number of different commercially available processors and a memory 72 for storing an installation code, one or more combination codes, and one or more identification codes. Data words are inputted either from a key 14 through a key reader 15 or from a programmer (either a console coded programmer or an enabling programmer to be described hereafter) through the programmer connector 24. The processor 70 is programmed to perform various processing steps such as decoding or comparing on the received data words whether from the key reader or from the programmer connector 24. For example, the specific processing steps for manipulating the data words from the keys 14 is described in copending patent application Ser. No. 369,290 filed on Apr. 16, 1982 which application is herein incorporated by reference.

In addition, the processor 70 is preprogrammed to accept altered data words from a console coded programmer 22 and to manipulate the altered data words in a preprogrammed manner to obtain combination code and identification code data. The resultant data may be compared with data from the memory 72 and utilized to actuate a lock bolt mechanism 74, or utilized to perform any other suitable function consistent with the preprogrammed criteria set forth in the software of the processor 70.

Figure 5:
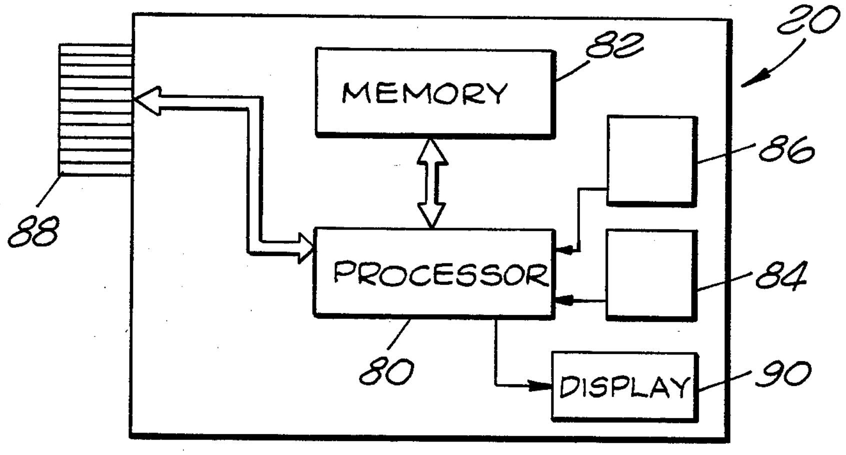
FIG. 5 is a simplified block diagram of an enabling programmer in accordance with the invention.

Referring next to FIG. 5, the system also includes an enabling programmer 26 having a processor 80, a memory 82, an actuate switch 84, a function select switch 86, a display 90 and a connector 88. Initially, an installation code is stored in the memory 82. Thereafter, the enabling programmer 26 may be used without being interconnected to or receiving data from the console 12. The installation code stored in the memory 82 is initially obtained either at the manufacturing plant or by coding at the central console. As previously discussed in connection with the console coded programmer of FIG. 3, the installation code may be stored in the memory 82 in a scrambled format with the processor 80 being preprogrammed to effect a proper unscrambling but only after the enabling programmer has verified interconnection to a lock. The establishment of a communication link between the enabling programmer and a lock via the connector 88 is indicated on the display 90. Similarly, if the lock successfully completes an indicated function or fails to complete an indicated function, the display will light indicating generally the cause of the lock's failure or its successful performance of the indicated function.

In operation, the enabling programmer once programmed with an installation code, may be used by first selecting a particular function to be performed by the lock such as opening the lock, storing a new combination code in the lock or any other desired operation and then selecting that function on the function select switch 82. Once the function has been selected on the function select switch 86, the actuate switch 84 is depressed initiating the program in the processor 80. The processor then generates a data word which includes the installation code 82 as well as a criteria/action code which indicates the particular function that the lock is to perform. The processor next verifies that a communication link has been established with a lock via the connector 88 after which the data word is transferred to the lock. The lock then reads the card inserted into the lock reader to obtain the combination code or other required data.

It will of course be appreciated that the processors in the console coded programmer, the enabling programmer and the lock are conventional commercially available processors of any suitable type. However, such processors have not been heretofore incorporated to provide secure communications in a security system. For example, in Genest et al. Pat. No. 4,283,710 the disclosed lock system incorporates security override modules which provide a data communication link between a central console and one or more locks in a security system. However, that security override module is a passive conduit for data in the sense that the data words are transferred from the console to the security override module and then transferred from the security override module to the lock without alteration or variation.

By contrast, as will be hereafter more fully described, data transferred into the console coded or enabling programmers is initially scrambled or otherwise manipulated to make the data unintelligible to an unauthorized person. The programmer processor is programmed to further manipulate the coded data word to either unscramble or otherwise operate on all or part of the coded data word in accordance with a preprogrammed operation set which is coordinated with the operation set of the console. The resultant altered data word transferred to the lock is therefore not the same as the coded data word stored in the programmer memory and indeed is not even generated until the programmer is confirmed by the processor as being in electronic communication with the lock.

Therefore, both the console coded programmer and the enabling programmer comprise unique secure communication links between the console or a key card and the locks thereby greatly increasing the security of the system.

Figure 6:
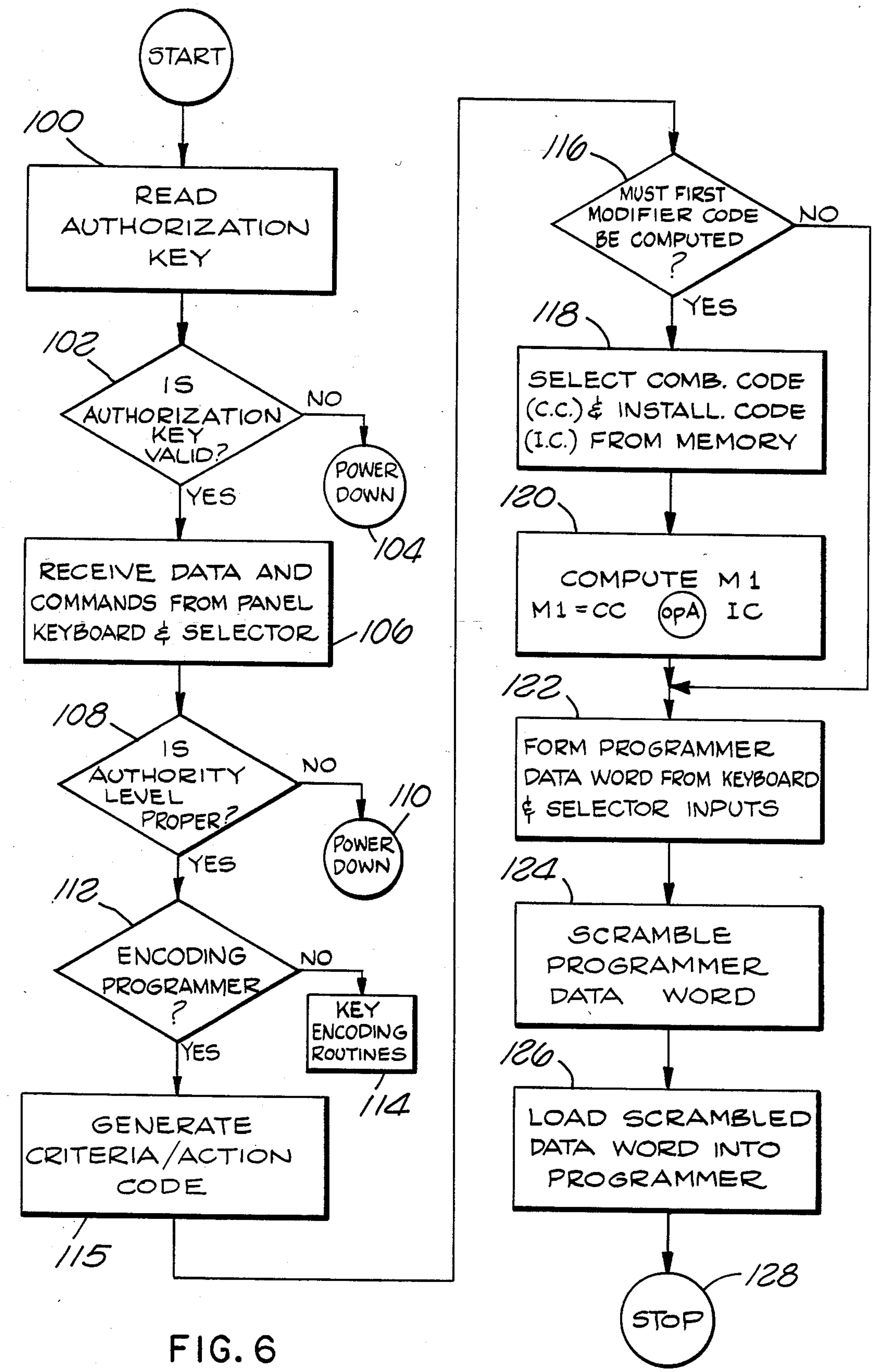
FIG. 6 is a flow chart illustrating the method of encoding a data word in the console in preparation for transmission to the console coded programmer.

Referring to FIG. 6, the operation of the console 12 (FIG. 2) is initiated by the insertion of an authorization card 18 into the authorization card reader 36 whereupon the authorization card reader 36 is commanded by the processor 30 to read the data on the authorization key (block 100). The processor 30 then receives the data from the authorization key and compares that data to, for example, with prestored data to determine whether or not the authorization key is valid (block 102). One particular method of testing data from the authorization key against authorization key data stored in the memory 32 is disclosed in Genest et al. Pat. No. 4,283,710. Of course any suitable means of evaluating the data from an authorization key to determine whether the data represents a valid or an invalid authorization key may be utilized and such methods are well known in the art. If the authorization key is invalid, then the console power is turned off (block 104). If the authorization key is valid, then the processor 30 is enabled to receive data from the keyboard 40 and commands from the selector 34 and the execute button 38 (block 106).

In the preferred embodiment, the processor 30 is programmed to further evaluate the data from the authorization key in view of the commands entered from the selector switch 34 and keyboard 40 to determine whether the operator who inserted the authorization key was possessed of sufficient authority to permit the requested operation to go forward (block 108). For example, an authorization key possessed by a hotel manager would be recognized as being the key card of the manager. Therefore, the console could, for example, make a master key upon suitable data entry into the keyboard 40 and suitable positioning of the selector switch 34. On the other hand, if the authorization key was that of a clerk, the same operation would be rejected by the console and a master key would not be coded.

Therefore, the processor 30 evaluates the requested command and input data against the data from the authorization key and if the authorization level is improper, then the processor commands the console to power down (block 110). The processor 30 may, prior to initiating a power down, cause the printer 50 to record the transaction. Alternatively, the console may simply indicate a rejection of the requested operation and wait for another command from the selector switch 34.

If the authorization level is proper so as to enable the processor to perform the requested operation, the processor next determines whether it will be encoding a console coded programmer or will be encoding a key (block 112). If a key is to be encoded, then the processor 30 initiates a suitable key encoding routine (block 114) which is beyond the scope of the present invention and will not be discussed further.

On the other hand, if data is to be encoded for transfer to a console coded programmer the processor 30 generates a criteria/action code (block 115) based upon the commands inputted from the selector 34, the level of authority of the authorization key 18, the data stored in the console memory and the data inputted through the keyboard 40 and displayed on the left or right display 46 or 48 as will be more fully described in connection with FIG. 9.

The processor next determines, based upon the operation indicated by the selector switch 34 and the data input through the keyboard 40, whether or not a first modifier code must be computed (block 116). In general, a first modifier code will be required only if a lock is to be coded with a combination code either from the memory 32 or with a new combination code generated by the processor 30. If it is determined that a first modifier code (N1) is not to be computed then the processor 30 immediately commences the formation of a programmer data word (block 122) based upon data from the selector inputs and data from the memory 32 as will be more fully described in connection with FIG. 9. If a code combination is to be stored in one of the locks, then a first modifier code must be computed by the processor 30. Therefore, the processor 30 first selects a combination code from the memory 32 based upon data inputted through the keyboard 40 (block 118). In accordance with the invention, when a programmer is coded, only existing combination codes stored in the memory 32 will be utilized. By contrast, if a key 14 is to be encoded, then it is possible to encode that key with a new combination code in which event the processor generates a new code combination using a predefined combination code generating routine.

Returning to FIG. 6, in addition to selecting a combination code, the processor 30 also selects an identification code as well as the installation code of the system from the memory 32. The first modifier code (M1) is then computed by combining the selected combination code (CC) and the installation code (IC) according to one or more preprogrammed operations (block 120). For example, the preprogrammed operation may consist of an addition in which case the combination code and the installation code would be added together to obtain the first modifier code.

At this juncture, it is noted that in the preferred system each lock has one or more levels of memory. A combination code and an identification code is stored in each such level. Each level preferably represents a different level of access to the lock so that, for example, the combination code and identification code stored in level 3 of a lock are unique to that particular lock and a programmer or key card programmed with such a combination code and identification code will open only that lock. On the other hand, the level two memory of several locks may be coded with the same combination code and identification code so that a key card or programmer having corresponding combination and identification code data stored thereon will be able to open any of several different locks upon positive correspondence between the data in the lock and data from the programmer or key card.

Returning to FIG. 6, the first modifier code is next combined with the criteria/action code and the installation code and possibly one or more identification codes to identify a particular lock or level of memory in the lock or both to form the programmer data word having a format to be hereafter described in conjunction with FIG. 9 (block 122).

In order to provide increased security, the programmer data word is next scrambled according to a predefined scrambling pattern by the central console 12 (block 124) to obtain the coded data word. Any suitable scrambling scheme may be incorporated within the perview of the present invention. For example, the scrambling may comprise simply inverting the data in the programmer data word so that all of the 'ones' are 'zeros' and all of the 'zeros' are 'ones'. Alternatively, the scrambling could be accomplished by any desired mathematical or logical operation.

Finally, the resultant coded data word is loaded into the console coded programmer memory 62 (block 126) with the console 12 returning to an idle or power down mode (128).

Figure 7:
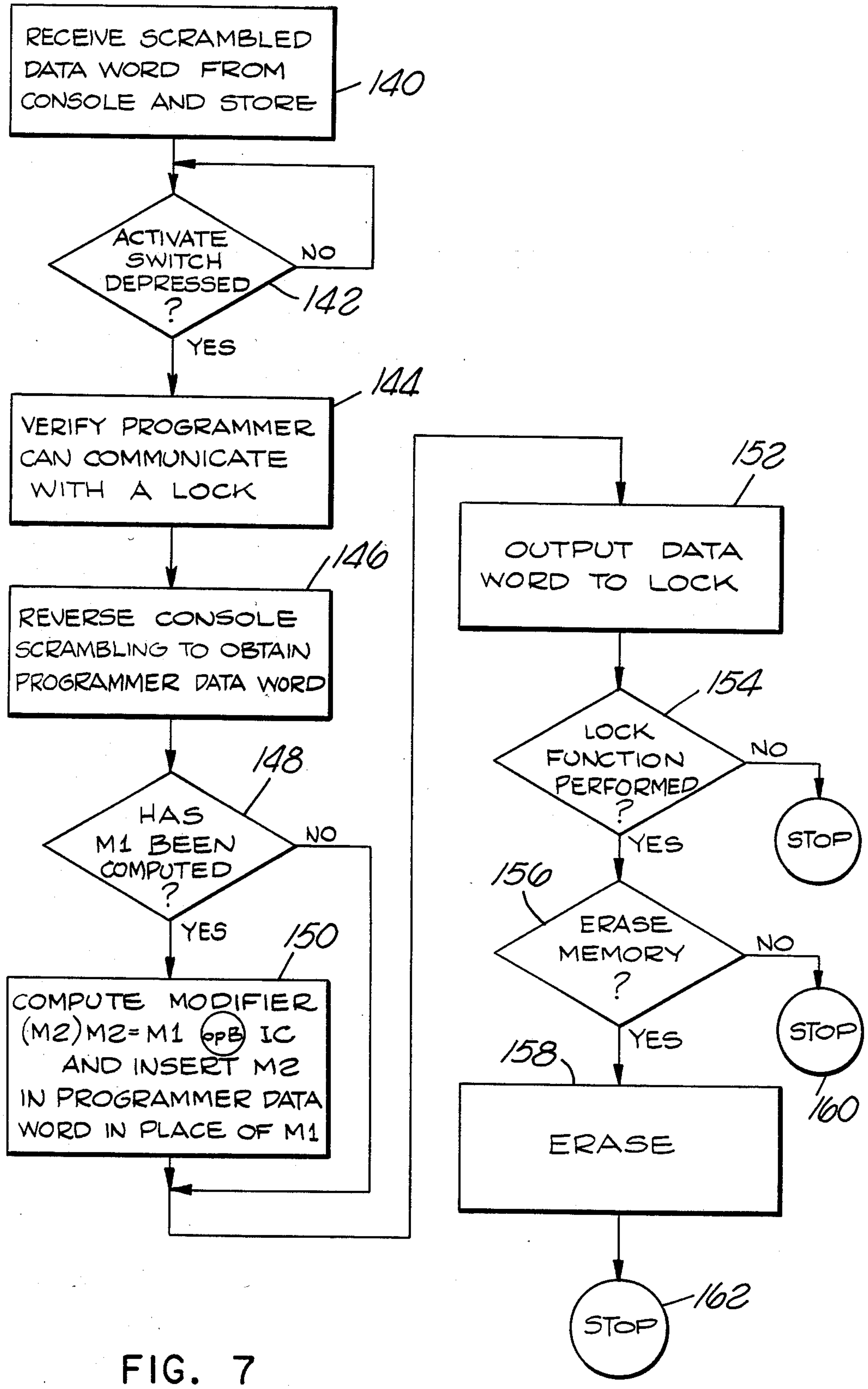
FIG. 7 is a simplified flow chart illustrating the decoding and encoding performed by the console coded programmer or an enabling programmer.

Referring next to FIG. 7, a flow chart of the program in the console coded programmer is illustrated. The console coded programmer 22 initially receives a coded data word from the console 12 and stores that coded data word in its memory 62 (block 140). The processor 60 in the programmer 22 then waits until the activate switch 64 is depressed (block 142). Once the activate switch is depressed, the processor 60 first verifies that the programmer 22 is in electronic communication with a lock 16. If electronic communication is not verified then the processor 60 provides an indication to the operator via a display or by other suitable mechanism (not shown). If the processor 60 verifies that the programmer is in communication with the lock (block 144) then the processor initially reverses the scrambling process performed on the programmer data word in the central console (block 146) thereby recapturing the original programmer data word which was generated by the console (block 122 of FIG. 6).

The processor 60 of the console coded programmer 22 next determines whether a first modifier code (M1) is present in the programmer data word (block 148). If a first modifier code (M1) was generated and is present as part of the unscrambled programmer data word, then the processor 60 computes a second modifier code (M2) by combining the first modifier code (M1) with the installation code (jC) from the unscrambled data word. The resultant second modifier code (M2) is inserted into the unscrambled data word in place of the first modifier code (block 150). The resultant modified or altered data word is then outputted to the lock (block 152).

If a first modifier code has not been computed then the unscrambled data word is transferred to the lock without further modification as the altered data word.

After the altered data word has been transferred to the lock, the console coded programmer waits for verification from the lock that the transferred data word has been accepted, utilized and the commanded function performed (block 154). If the altered data word is not accepted, then the programmer may turn on a light on the programmer display 68 indicating why the altered data word was not used to enable the operator to take appropriate corrective action. If the altered data word is utilized by the lock and the appropriate function performed, then the lock also communicates that information to the console coded programmer 22. The programmer processor 60 then determines, based upon the criteria/action code and the indication from the lock that the altered data word was accepted, whether the coded data word in the memory 62 should be erased or not (blocks 156 and 158). The program in the console coded programmer then terminates (blocks 160 and 162).

Figure 8:
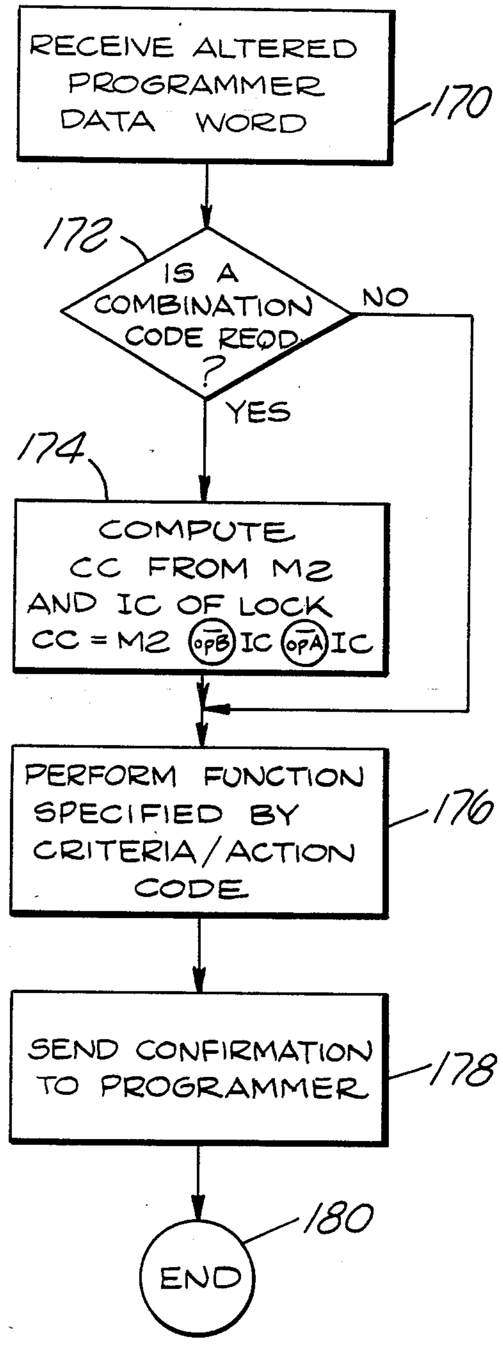
FIG. 8 is a simplified flow chart illustrating the decoding function performed by the lock in the present system.

Referring to FIG. 8, a simplified flow diagram of the pertinent part of the program of the lock's processor is illustrated. Specifically, when an altered data word is received from either a key coded programmer or a console coded programmer (block 170) the lock processor initially evaluates the criteria/action code to determine whether a code combination is required to perform the specified function (block 172). If a combination code is required, then the processor 70 computes the combination code from the second modifier code (M2) which is part of the altered data word received by the lock and the installation code (IC) which is stored in the lock's memory.

The specific computations which are performed by the lock to obtain the combination code are in essence the reverse computations of the preprogrammed operation in the console coded programmer which yielded the second modifier code and the preprogrammed operation in the console which was used to obtain the first modifier code. Therefore, the lock 16 first combines the second modifier code (M2) and the installation code (IC) according to a predefined operation set which is the inverse of the predefined operation set programmed in the console coded programmer to obtain the first modifier code (M1). The resultant first modifier code (M1) is then combined with the installation code (IC) from the lock according to a second operation set which is the inverse of the operation set programmed into the processor of the console used to originally generate the first modifier code (M1). The result is the combination code (CC) originally obtained from the console's memory (block 174).

After the combination code has been computed, the lock performs the function specified by the criteria/action code (block 176). Upon satisfactory completion of that function the lock sends a confirmation code to the console coded programmer (block 178) which the console coded programmer may use to power down, cause a memory erasure or cause any other preprogrammed function to be performed and the program terminates (block 180).

By way of specific illustration, assume that the security system includes a central console, a console coded programmer and one or more locks. Each lock has four levels of memory in each of which is stored a combination code and an identification code. The level zero memory of the lock contains a combination code and an identification code which is common to the combination code and identification code stored in the level zero memory of all other locks in the security system; each combination code and identification code assigned to a level 1 memory is common to a large group but not all of the locks in the security system; each combination code and identification code assigned to a level 2 memory is common to the level 2 memories of a much smaller group of locks; and finally, the combination code and the identification code stored in the level 3 memory of each lock is unique to that lock and that lock alone. Therefore, a console coded programmer with a combination code and identification code corresponding to the combination code and identification code stored in level zero of a lock will, in fact, open all locks in the security system and will in essence be a "master key." Similarly, a console coded programmer in which is stored a combination code and identification code corresponding to the combination code and identification code stored in either level 1 or 2 will open all of the locks in those particular groupings and finally a console coded programmer in which is stored a combination code and an identification code corresponding to the combination code and identification code in the level 3 memory of a lock will open just that lock.

Referring next to FIGS. 9A and 9B a chart is illustrated showing several specific examples of the operation of the system in accordance with the invention. The purpose of Example 1 is to enable a console coded programmer to simply open a lock of a specified room. It is therefore sufficient to require that the identification codes and installation codes in the console coded programmer and the lock match. To generate the proper programmer data word in the console, the selector switch 34 is rotated to the "open lock" position (column 3) and the identification code, which in the preferred embodiment is simply the room number, is punched in via the keyboard 40 (column 1). As the room number or level 3 identification code is inserted through the keyboard, it will be displayed in the left display 46 on the keyboard. If the inserted identification code is in the right display 48 then it is merely necessary to clear the display by depressing the * button 43 and then depressing the "other display" button 41.

After inserting the data, the execute button 38 is depressed. The preprogrammed processor 30 in the console then causes a programmer data word to be generated. This function may be performed by any valid authorization key (column 4). Because only a single lock is to be opened, no other identification codes need be entered. Hence, the right display reading (column 2) will be left blank.

Upon inputting the above data, the console coded processor 30 in the console 12 will generate a programmer data word having a format illustrated in columns 5 through 9. First, the console will generate a criteria/action code (column 5) which, in the present illustration is a 3-digit hexidecimal code. This code includes information as to what criteria must be satisfied in order for the lock to perform the function which is also specified by the criteria/action code. The value of the criteria/action code will be sensed by a lock which will be programmed to perform a different function for each of the defined criteria/action codes generated by the processor 30 and will become part of the programmer data word. In the particular example being considered, the criteria/action code is defined by the processor to be C83.

In general, the programmer data word also contains a 6-digit modifier code (column 6), a 4-digit secondary ID code (column 7), a 6-digit installation code (column 8) and a 4-digit main ID code (column 9). In the present example where it is desired merely to open a lock, neither a modifier code nor a secondary ID code are required so the data in columns 6 and 7 are left blank. However, to assure that a programmer from another security system will not be able to open a lock in the present security system, the main console inserts the installation code for the system in column 8. As previously indicated, the installation code is stored in the console as well as each lock of the security system.

Finally, since it is desired to open the lock securing member 105, the identification code (0105) for that room inputted via the keyboard 40, is stored in the four digits of column 9.

The programmer data word (C830000000000002248760105) is then scrambled according to a preprogrammed operation set such as a binary inversion, bit shifting, the addition of a constant, or any other suitable scrambling operation. Because there is no code combination required in this example, a modifier code is not required and the above-described modification of the programmer data word in the lock (blocks 118 and 120 of FIG. 6) is not performed.

The resultant coded programmer data word is then inputted to the console coded programmer which is taken to the lock of room 105 where it is inserted. Upon depression of the activate button on the console coded programmer and upon confirmation of electronic communication with the lock, the coded data word is unscrambled and then transferred to the lock. The processor in the lock then "reads" the criteria/action code and to determine that the action desired is that the lock open (column 16) and that the criteria which must be met for the lock to open is that the main identification code must be equal to the identification code stored in the level 3 memory of the lock and further that the installation code (column 8) must correspond to the installation code stored in the lock (column 10 and column 14). Therefore, the lock processor compares the installation code of the programmer data word (column 8) with the installation code stored in the lock memory. If correspondence occurs, then the lock processor compares the main identification code which is the level 3 identification code (column 9), against the lock's identification code stored in the level 3 memory. If correspondence also occurs in this comparison, then the console coded processor actuates the bolt on the lock and the lock is opened.

Upon completing this "open" action, the lock sends a signal to the console coded programmer which is programmed to sense one or more bits of the criteria/action code which indicates that all authorization keys can be used to perform this action. Such being the case, the console coded programmer is coded to enable only a single lock to be opened without again returning to the central console for recoding. Therefore, the console coded programmer upon sensing completion of the function to be performed by the lock erases the programmer data so that no further operations can be performed by the console coded programmer.

In example 2 illustrated in FIG. 9, a lock is again to be opened. However, in this situation it is desired to open several locks without having to return to the console to have the console coded programmer reprogrammed. A console coded programmer can only be coded to enable a lock to open in this case by the manager. Thus, the authorization level (column 4) must be limited to only those authorization keys possessed by managers. In addition because multiple rooms are to be opened, no specific room number is inserted through the keyboard and therefore the left display reading (column 1) and the right display reading (column 2) will both remain blank.

Again the selector switch setting on the console is set to the open lock position (column 3). The resultant programmer data word includes a criteria/action code (column 5) and an installation code (column 8). The data in columns 6, 7 and 9 are ignored. When the data word is thereafter unscrambled and inserted in to a lock, the lock senses that the only comparison required to cause the lock to open will be a positive comparison between the installation code of the altered data word and the installation code stored in the lock. In addition, the console coded programmer senses that the value of the criteria/action code is such that multiple locks are to be opened and therefore the coded data word in the programmer memory is not erased after an insertion into a lock.

In example 3, the function to be performed is to synchronize the data in a particular level of memory in a particular lock with the data stored for that level of memory in the console.

As previously indicated, all combination codes and identification codes for all locks must be stored both in one or more locks and in the console. A synchronizing operation will be required if the data stored in a particular level of memory in a particular lock is, for one reason or another, changed so that it does not correspond to the data stored for that lock and level of memory in the central console.

Assume that the combination code in level 3 of room 105 has gotten out of synchronization with the combination code stored in the central console for that memory level and lock. To bring the lock into synchronization with the console, the console coded programmer is first inserted in the central console, the room number is inserted via the keyboard into the left display, the selector dial is positioned pointing to "synch" and an authorization card is inserted in the central console. In this particular example, the console is programmed to perform this function upon the insertion of any level of authorization key. Thereafter, upon depression of the execute switch 38, the console processor 30 generates a programmer data word having a criteria/action code of C2B (column 5). The installation code is then placed in the 6 digits of column 8 and the level 3 identification code (the room number) inserted in the four digits of column 9. To provide increased security, however, the combination code is not inserted into the digits of the programmer data word. Rather, as indicated in blocks 118 and 120 of FIG. 6, a first modifier code (M1) is computed from the combination code (CC) and the installation code (IC). For example, if the combination code was the 6-digit number 232323 and the installation code was the 6-digit number 224876, and the combining operation programmed into the console was the addition of the combination code and the installation code, then the first modifier code which would be placed in the 6-digit column 6 position of the programmer data word would be equal to 457199. The secondary identification code in column 7 will not be used and hence those digits are ignored. The resultant programmer data word is then scrambled and transferred into the console coded programmer memory.

The console coded programmer is then taken to a particular lock and upon establishment of a proper communication link with the lock and upon depression of the actuate button 84 on the console coded programmer, the coded data word is unscrambled. Before outputting the unscrambled coded data word however, the first modifier code in column 6 is again modified according to a second operation which may for example be simply the further addition of the first modifier code with the installation code. The resultant second modifier code so generated will be the 6-digit number 682075. This number is inserted into column (6) in place of the first modifier code and the resultant altered data word transferred to the lock. The lock sensing the value of the criteria/action code recognizes that the programmer data word has a modifier code which must be decoded to obtain the proper combination code. The lock has therefore been preprogrammed to reverse the above-described addition operations by first subtracting the installation code stored in the lock from the second modifier code value. That is, the installation code value 224876 is subtracted from the second modifier code value 682075 to obtain the first modifier code value of 457199. The installation code value is then again subtracted from the first modifier code value to yield the original combination code 232323. The lock then compares the installation code of the decoded data word against the installation code stored in the lock and if a comparison exists the identification code of column 9 in the programmer data word is compared against the identification code of the level 3 memory of the lock. If a comparison occurs, then the action indicated by the criteria/action code is to store the combination code in the level 3 memory of the lock in place of the combination code previously stored in that memory level.

A similar synchronizing operation can be performed for each level of memory as illustrated in examples 4 and 5 of FIG. 9. However, if such an operation is performed by a clerk's authorization card, then the console coded programmer will be limited to one operation at a time so that the console coded programmer will have to be returned to the central console to be reprogrammed once the combination code of a particular memory level of a particular lock has been synchronized.

It can be seen, therefore, that the master identification code, the submaster identification code and section identification code (illustrated as the numbers 5,000, 8,000, and 7,000, respectively in FIG. 9) as well as the level 3 identification code (room number) will have to be inputted via the keyboard. In the present illustration, the level 3 identification code will be inserted and displayed in the left display 46 (FIG. 2) after which the number symbol key 41 on the keyboard will be depressed allowing the identification code levels 0, 1 or 2 to be inserted and displayed in the right display. The main identification code word in the four digits of column 9 of the programmer data word will contain the identification code for levels 0, 1 or 2 while the secondary identification code will be contained in the first four digits of column 7. The programmer data word is then modified and scrambled according to the above-described method in accordance with the invention. When the altered data word is inserted into the lock, the lock will sense the value of the criteria/action code and will be programmed to require that the installation code in the altered data word match the installation code of the lock; the identification code of the level 3 memory match the secondary identification code of the altered data word and the level 0, level 1, or level 2 identification code match the main identification code in column 9. If all of the above matches occur, then the combination code derived from the second modifier code in column 6 will be stored in the level 0, level 1 or level 2 memory as specified by the criteria/action code in place of the combination code stored in that memory level.

Finally, with reference to example 5, it is desired to change the submaster combination code for a number of locks to bring each of those locks into synchronization with the combination code for that submaster memory level. Because the synchronization is to be accomplished on a number of locks, it is necessary that the authorization card be a manager level authorization card. As with examples 3, 4 and 6, the selector switch is rotated to the "synch" position and the appropriate submaster (level 1) identification code inserted via keyboard 40. The number switch 41 is depressed if the panel of the console indicates that the data input from the keyboard will be shifted into the left display. This will assure that the level 1 identification code will be shifted into the right display register.

A level 3 identification code indicating a particular room number is not entered since the synchronization function is to be performed on a number of locks not just a single lock.

After insertion of the above data, the execute button 38 is depressed causing the processor 30 to form a programmer data word comprised of a criteria/action code designated, for example, by the hexidecimal number C29 (column 5) a modifier code which is the 6-digit code in column 6, a 6-digit installation code in column 8 and a 4-digit main identification code which is the level 1 identification code appearing in the right display 48 of the console. The 6 digits in the seventh column will not be used and hence may be left blank, may be set to 0 or may be set to any other convenient value.

After appropriate encoding and scrambling as described above, the coded data word is transferred to the console coded programmer which is then taken to one of the locks in the group of locks to be synchronized where it is inserted into the programmer connector. In the manner described above, the coded data word is suitably modified and transferred to the lock where it is again modified to obtain the proper combination code. The lock further looks at the criteria/action code and determines that the installation code in the altered data word must match the installation code of the lock and the level 1 identification code stored in the lock must match the identification code stored in column 9 of the programmer data word. If these two matches occur, then the processor of the lock stores the combination code derived from the altered data word in the level 1 memory of the lock in place of the combination code stored therein. The console coded programmer is then removed from the lock and the same procedure repeated for the next lock having the same level 1 identification code.

While the above examples have been given as illustrative of the method by which the security system may be operated according to the present invention, it will be appreciated that the lock can be programmed to perform any number of additional functions including modification of identification codes, modification of an installation code, double locking a particular lock, or any other desired function. Each such function will have a unique criteria/action code associated therewith which provides the lock with the criteria which must be met before the lock will perform a particular action. The console coded programmer also incorporates a processor which alters the individual bits of the coded data word in some predefined manner before generating and outputting the altered data word to a particular lock. Therefore, a particular criteria/action code, combination code, installation code, or identification code will not be discernable if an unauthorized person reads the contents of the memory of the programmer. Hence, security is greatly increased over prior security systems.

In accordance with another feature of the present invention, an emergency or enabling programmer may also be provided as part of the security system to enable locks to be opened if the console becomes inoperative. Alternatively, for smaller scale systems the emergency or enabling programmer may be used without the necessity of incorporating a console in the system. In such an embodiment, the enabling programmer operates essentially the same as the previously described console coded programmer except that the coded data words are inserted into a lock via a key which has been preprogrammed at the central console in the security system or by a the manufacturer owned console. The reading of the data on the key and the function to be performed is controlled by the enabling programmer but only if the installation code in the scrambled data word matches the installation code stored in the lock. The keys are programmed with coded programmer data words as they would be generated and outputted from a central console as previously described with each card being marked with appropriate markings indicating the function which will be performed upon insertion of both an enabling programmer and that key into a selected lock. The coded data word transferred into the lock may include a scrambled programmer data word which may or may not include a first modifier code. When the enabling programmer is inserted in a lock, the enabling programmer initially unscrambles the coded data word which includes the installation code and the criteria/action code. Thereafter, the resultant altered data word is transferred to the lock where it is used to effect the desired lock operation if the installation codes match.

It will be appreciated that the coded data word in the enabling programmer may have a criteria/action code which instructs the lock to perform a particular function without altering the existing stored combination codes and identification codes so that synchronization between each of the locks and the inoperative central console will not be altered by use of the enabling programmer. If such an operation mode is desired, the programmer data word may for example be somewhat similar to the programmer data word of example 1 or example 2 in FIG. 9.

In sum therefor, the present invention comprises an active programmer link to one or more locks as well as the method of communicating data from a central console or other source to a remote location such as a lock via an active programmer. The invention thus provides a system of greatly increased security over prior systems where data outputted from a central console was readily readable thus resulting in a weak link in the system at the point of the communication of data between a central location and one or more remote locations. The present invention overcomes this deficiency thereby greatly increasing security by appropriately masking or otherwise modifying the combination code as well as scrambling to thereby modify the entire programmer data word both at the central console and in the programmer itself. Each component of the present system is therefore functionally interrelated in that each must be programmed in a way that the scrambling and masking performed in either the console or in a programmer can be reversed in the lock.

It will be further appreciated that the above methods and system can be embodied with many modifications and alterations within the scope of the present invention and it is therefore the object of the claims to cover all such modifications and variations as fall within the true spirit and scope of the invention.

What is claimed is:

1. A method for securely communicating data to a lock device in a system having a central console, a console coded programmer having a memory and a data word modifying means, and at least one lock, the console having a memory in which is stored at least one combination code for each lock in the system, the method comprising the steps of:

(a) selecting a combination code for a specified lock from the memory of the central console;

(b) generating a first modifier code from the selected combination code according to a first predefined operation set;

(c) generating a programmer data word in the central console, the programmer data word having the first modifier code as a portion thereof;

(d) scrambling the contents of the programmer data word according to a second predefined operation set to obtain a coded data word;

(e) transferring the coded data word from the central console to the console coded programmer and storing the coded data word in the console coded programmer memory;

(f) unscrambling the coded data word in the programmer data word modifying means to recover the programmer data word;

(g) generating a second modifier code in the programmer data word modifying means by altering the first modifier code according to a third predefined operation set to obtain an altered data word in the programmer;

(h) transferring the altered data word from the console coded programmer to the lock; and (i) generating the combination code in the lock for use therein by operating on the second modifier code according to a fourth predefined operation set to obtain the first modifier code and then modifying the first modifier code according to a fifth predefined operation set to obtain the combination code.

2. The method of claim 1 wherein the fourth operation set is the reverse of the third operation set and the fifth operation set is the reverse of the first operation set.

3. The method of claims 1 or 2 wherein each lock and the central console has an installation code stored therein wherein the first predefined operation set comprises combining the selected combination code and the installation code stored in the console according to a first predefined criteria and the third predefined operation set comprises combining the first modifier code and the installation code from the recovered programmer data word in the programmer according to a second predefined criteria.

4. The method of claim 3 wherein the installation code used in step (i) is the installation code prestored in the lock.

5. A method for securely communicating to a lock in a system having a programmer with a memory and a word modifying means and at least one lock, each lock having the installation code stored therein, the method comprising the steps of:

(a) generating a programmer data word which includes at least the installation code;

(b) scrambling the programmer data word according to a first predefined operation set to obtain a coded data word;

(c) transferring the coded data word to the programmer and storing the coded data word in the memory therein;

(d) inserting the programmer into a lock;

(e) causing the word modifying means of the programmer to operate on the coded data word according to a second predefined operation set to obtain an altered data word in response to insertion of the programmer into the lock; and (f) transferring the altered data word from the programmer to the lock to effect performance of a predefined function by the lock.

6. The method of claim 5 wherein the system further includes at least one key coded with data and each lock includes a key reader for reading data from the key and transferring the read data to the lock, the method further comprising the steps of:

inserting a key into the key reader of the lock at the same time that the programmer is inserted into the lock; and reading the data from the key into the lock in response to the reading of the coded data word from the programmer.

7. The method of claims 5 or 6 wherein the coded data word from the programmer is used to effect performance of the predefined function by the lock only if the installation code of the programmer data word matches the installation code of the lock.

8. The method of claim 5 wherein the system further includes a central console where the programmer data word is generated in the central console and the coded data word is selectively erased when the programmer is inserted in a lock and the altered data word is transferred to the lock and the performance of the predefined function initiated.

9. A system for securely communicating data comprising:

a central console comprising a data memory, a first data processor, a data input means and a connector whereby coded data words are formed by the first data processor in response to commands and data from the data input means and data from the data memory for being outputted through the connector;

at least one programmer for receiving coded data words through the connector comprising a first memory for storing each received coded data word, a first data word modifying means for operating on the coded data word according to a first predefined operation set to obtain an altered data word, and means for selectively linking the programmer to at least one electronic lock; and at least one electronic lock remote from the console for receiving the altered data word from the first programmer and using the altered data word for initiating one or more operations with the lock.

10. The system of claim 9 wherein at least one of the programmers comprises a programmer adapted to be inserted into the console to selectively receive the coded data words therefrom for transfer to the lock, the lock selectively erasing the coded data from the programmer.

11. The system of claims 9 or 10 wherein each lock further comprises a key reader, the system further comprising:

a key precoded with at least one data word wherein at least one of the programmers comprises an enabling programmer with an installation code stored in the first memory, the enabling programmer adapted to be inserted into a lock to enable the key reader of the lock to read the data word from a key inserted therein only if the installation code of the enabling programmer matches the installation code of the lock.

12. A programmer communication link for an electronic lock system for providing data word communication from a data source to a lock wherein the data source provides data words coded according to a first predetermined modifying operation set, to the programmer, the programmer comprising:

a data word memory for receiving and storing coded data words from the data word source;

connector means for coupling the programmer to the data word source to receive coded data words therefrom and for coupling to the lock;

data word altering means for modifying the coded data word in the data word memory according to a second predetermined modifying operation set to obtain an altered data word recognizable by and useful in the lock; and means for initiating transmission of the altered data word from the programmer to the lock the altered data word being transmitted to the lock through the connector means in response to actuation of the initiating means.

13. The programmer of claim 12 wherein the data source further comprises a first modifying means for modifying a selected portion of a data word formed therein according to a first coding operation set to obtain a programmer data word, and further includes second modifying means for scrambling the contents of the programmer data word according to a second coding operation set to provide the coded data word for the programmer, the data word altering means of the programmer further comprising;

unscrambling means for reversing the scrambling of the console's scrambling means to recover the programmer data word; and third modifying means for further modifying the modified portion of the programmer data word according to a third coding operation set to obtain the altered data word, the lock including means for reversing first the third coding operation set and then the first coding operation set to obtain the decoded data word information generated by the console.

14. An electronic lock system comprising:

data source for providing a coded data word, the coded data word being a data word modified according to a first modifying operation;

a programmer comprising:

means for receiving a coded data word from the data source;

means for altering the coded data word stored in the storing means before transmission of the coded data word from the programmer according to a second predefined modifying operation for defining an altered data word; and means for initiating the transfer of the altered data word from the programmer; and a lock means remote from the data source comprising:

means for receiving the altered data words from the programmer; and means for interpreting the altered data word for use in the data receiving means.

15. The electronic lock system of claim 14 wherein the data source comprises:

data word generating means for selectively forming data words;

first modifying means for modifying a first selected portion of each data word according to a first coding operation to obtain a programmer data word;

scrambling means for scrambling the contents of the programmer data word according to a second coding operation to define the coded data word; and means for transferring the coded data word to the programmer;

and wherein the means for altering the coded data word in the programmer further comprises:

means for unscrambling the coded data word to obtain the programmer data word, and second modifying means for modifying a second selected portion of the obtained programmer data word according to a third coding operation to define the altered data word; and wherein the means for interpreting in the lock further comprises:

means for reversing the second coding operation and the first coding operation for obtaining the originally coded data word.

16. A method of securely communicating data from a data source to a lock in an electronic lock system of comprising the steps:

(a) encoding a data word according to a first modifying operation to obtain a coded data word at the data source;

(b) coupling a programmer in communication with the data source;

(c) transferring the coded data word from the data source to a memory in a programmer;

(d) uncoupling the programmer from communication with the data source;

(e) placing the programmer into data communication with the lock;

(f) altering the coded data word for insertion into the lock when the programmer is in data communication with the lock; and (g) transferring the altered data word to the lock for use therein.

17. The method of claim 16 wherein the altered data word transferred to the lock and the data word coded to generate the coded data word are the same.

18. The method of claim 16 wherein the step of encoding comprises the steps of:

generating a data word;

modifying at least a first selected portion of the data word according to a first predefined coding operation to obtain a programmer data word; and scrambling the programmer data word according to a predefined scrambling operation to obtain the coded data word;

wherein the step of altering the coded data word comprises the steps of:

unscrambling the coded data word to obtain the programmer data word; and modifying at least a second selected portion of the obtained programmer data word according to a second predefined coding operation to obtain the altered data word; and the method further comprising the step of decoding the altered data word in the lock by reversing the second coding operation and the first coding operation to obtain the originally coded data word for use in the lock.

* * * * *